United States Patent [19]

Ito

[11] Patent Number: 4,615,357

[45] Date of Patent: Oct. 7, 1986

[54] APPARATUS FOR CONTROLLING ACTUATORS OPERATIVE UNDER NEGATIVE PRESSURE

[75] Inventor: Tosikazu Ito, Ibaraki, Japan

[73] Assignee: Hitachi, Ltd., Tokyo, Japan

[21] Appl. No.: 769,323

[22] Filed: Aug. 26, 1985

[30] Foreign Application Priority Data

Sep. 7, 1984 [JP] Japan .................................. 59-186367

[51] Int. Cl.⁴ .............................................. F15B 13/06
[52] U.S. Cl. ................................. 137/596.17; 98/2.01; 165/42; 165/43; 251/129.2
[58] Field of Search ............................ 137/596.17, 883; 62/244; 98/2.01; 165/42, 43; 251/129.16, 129.2

[56] References Cited

U.S. PATENT DOCUMENTS

| | | | |
|---|---|---|---|
| 4,250,924 | 2/1981 | Sakakibara et al. | 251/129.2 X |
| 4,320,797 | 3/1982 | Kagohata | 165/43 X |
| 4,478,274 | 10/1984 | Naganoma et al. | 165/42 X |
| 4,513,808 | 4/1985 | Ito et al. | 62/239 X |

FOREIGN PATENT DOCUMENTS 2926990 1/1981 Fed. Rep. of Germany ...... 137/883

Primary Examiner—Gerald A. Michalsky
Attorney, Agent, or Firm—Antonelli, Terry & Wands

[57] ABSTRACT

An actuator control apparatus used for the control or the like of an air-conditioning system installed in a motor vehicle comprises a pressure source capable of producing alternately a negative pressure and the atmospheric pressure, a decision circuit for determining whether vacuum or the atmospheric pressure is to be applied to the vacuum actuators, control means responding to the output of the decision means for connecting the actuator to be supplied with the negative pressure to the pressure source during a period in which the pressure source produces the negative pressure and connecting the actuator to be supplied with the atmospheric pressure to the pressure source during a period in which the pressure source produces the atmospheric pressure.

5 Claims, 8 Drawing Figures

```
TIMER COUNT PROCESSING — 112
ON/OFF CONTROL OF AIR
VALVES FOR VACUUM ACTUATOR — 113
RETURN — 114
```

| | | |
|---|---|---|
| $M_0$ | ATMOSPHERE/VACUUM | : OPERATION FLAG OF THREE-WAY VALVE |
| $M_1$ | 20 | : OPERATION FLAG OF A/V 1 |
| $M_2$ | 0 | : OPERATION FLAG OF A/V 2 |
| $\vdots$ | | $\vdots$ |
| $M_5$ | -15 | : OPERATION FLAG OF A/V 5 |
| $M_6$ | 8 | : OPERATION FLAG OF A/V 6 |
| $M_7$ | 0 | : OPERATION FLAG OF A/V 7 |

APPARATUS FOR CONTROLLING ACTUATORS OPERATIVE UNDER NEGATIVE PRESSURE

BACKGROUND OF THE INVENTION

The present invention relates to an apparatus for controlling actuators which are operated in response to vacuum or negative pressure and employed in an air conditioning system installed in a motor vehicle or the like.

The actuator control apparatus of the type mentioned above is employed for controlling electromagnetic valves through which negative pressure (vacuum) or the atmospheric pressure is supplied to actuators under command of a control circuit. Reference may be made to U.S. Pat. No. 4,513,808.

Consequently, the electromagnetic valves have to be necessarily electrically energized continuously either when the actuators are to be held in the state supplied with the atmospheric pressure or when the actuators have be maintained in the state supplied with the negative pressure, involving disadvantageous significant power consumption.

SUMMARY OF THE INVENTION

An object of the present invention is to eliminate the drawback of the prior art apparatus and provide a control apparatus for actuators operating in response to negative pressure (vacuum) in which no electric power supply is required for holding or maintaining the actuators in one or other operating state.

In view of the above object, I propose according to a general aspect of the invention a pneumatic actuator control apparatus which comprises a pressure source producing alternately a negative pressure (vacuum) and the atmospheric pressure as required, a decision circuit for deciding the fluid pressure medium required by the pneumatic actuators which are supplied with fluid pressure medium from the pressure source, and electromagnetic valve means for allowing the actuators to be communicated to an outlet port of the pressure source only during a period in which the fluid pressure required by the actuators are produced at the outlet port of the pressure source.

With the arrangement described above, the electric power is supplied to the electromagnetic valve means only upon application of the pneumatic pressure, whereby the power consumption can be significantly reduced.

DESCRIPTION OF THE PREFERRED EMBODIMENTS

Figure 1:
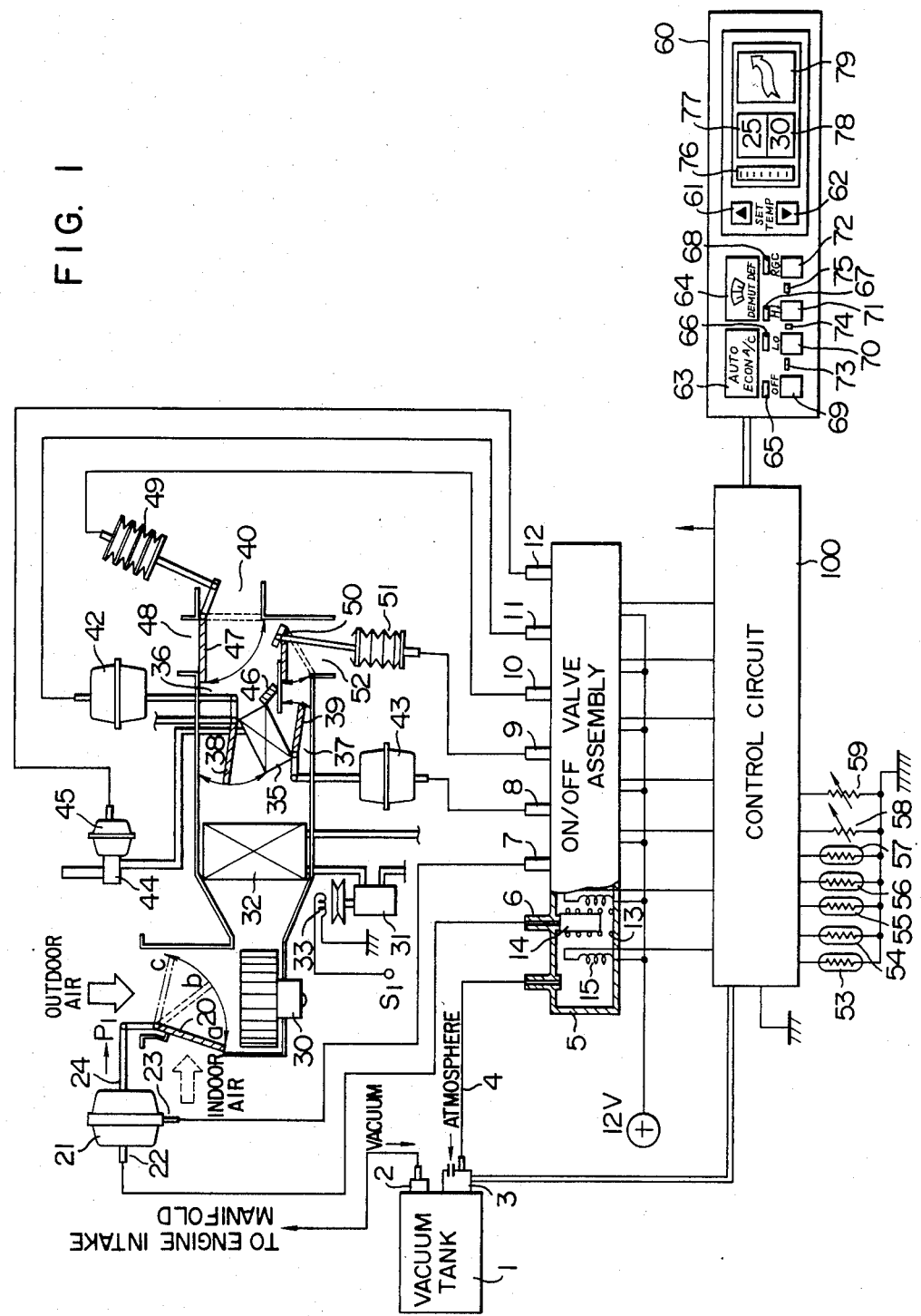
FIG. 1 is a view showing typically an arrangement of an air conditioning system for a motor vehicle which is controlled by pneumatic actuators and to which the control apparatus according to the present invention can be applied.

Now, the invention will be described in conjunction with an exemplary embodiment thereof applied to a control apparatus for an air conditioning system for a car by referring at first to FIG. 1.

A vacuum tank 1 is connected to an intake manifold of an internal combustion engine (not shown) by way of a check valve 2. Disposed at an outlet of the vacuum tank 1 is a three-way solenoid or electromagnetic valve 3 which is so controlled as to produce selectively either a negative pressure (vacuum) or atmospheric pressure from the vacuum tank 1. This arrangement may be implemented in such a structure as disclosed, for example, in Japanese Patent Publication No. 3964/1982. The negative pressure or atmospheric pressure produced from the vacuum tank 1 through the electromagnetic valve 3 is charged into a hermetically closed valve case 5 through a conduit or tube 4.

There are accommodated within the valve case 5 seven electromagnetic ON/OFF valves. Basically, each of these valves is composed of a valve element 14 resiliently urged by a spring 13 to close normally the associated one of outlet nipples 6 . . . , 12, and magnetic circuit means including an electromagnetic coil 15 which acts on a valve element supporting member of a magnetic material so that upon energization thereof the valve element 14 is withdrawn to open the associated outlet nipple under the electromagnetic attraction of the coil 15 by overcoming the force of the spring 13, as will be described in detail hereinafter.

An inner/outer air change-over door 20 is controlled by an actuator 21 to be selectively indexed to positions a, b or c. The actuator 21 may be of a known structure such as, for example, disclosed in Japanese Utility Model Publication No. 53841/1982. The actuator 21 has two diaphragm chambers partitioned by a diaphragm, wherein a first diaphragm chamber is provided with an inlet nipple 22 which is connected to the outlet nipple 6 of the valve case 5 so that the negative pressure (vacuum) or the atmospheric pressure is supplied to the first diaphragm chamber of the actuator 21. The other or second diaphragm chamber of the actuator 21 is supplied with the negative pressure or atmospheric pressure through an inlet nipple 23 which is communicated to the outlet nipple 7 of the valve case 5. The actuator 21 has a rod 24 which is constantly biased by a spring (not shown) in the direction indicated by an arrow $P_1$. Consequently, when the atmospheric pressure governs within both the diaphragm chambers of the actuator 21, the rod 24 is biased to the right as viewed in FIG. 1, as the result of which the door 20 is forced to assume the position a. In this state, the outdoor air is drawn through a blower 30 to be supplied to the air conditioning system. On the other hand, when the first diaphragm chamber is supplied with the vacuum or negative pressure through the inlet port 22, the rod 24 is withdrawn to the left as viewed in FIG. 1 under the negative pressure within the first chamber against the force of the spring (not shown), resulting in that the pivotally mounted door 20 is rotated to the position b. In this state, both the indoor air (i.e. air within the vehicle chamber) and the outdoor air are supplied at equal rate to the air conditioning system through the blower 30. In case the negative pressure is applied to both of the first and second diaphragm chambers, the rod 24 is further displaced to the left as viewed in FIG. 1 against the spring force, whereby the door 20 is moved to the position c. In this state, the indoor air is led to the air conditioning system through the blower 30.

The air drawn through the blower 30 is cooled and gets free of moisture in the course of flowing through an evaporator or vaporizer 32 when a compressor 31 is driven. A reference numral 33 denotes a coil of an electromagnetic clutch which serves to couple or decouple the compressor and the engine to or from each other in response to an output signal of a control circuit 100 applied to a terminal $S_1$ of the electromagnetic clutch.

The air leaving the evaporator 32 flows into a heater core 35 or flows through by-pass passages 36 and 37 formed around the heater core 35.

Disposed within the passage 36 is an air mixing door 38 which serves to control the ratio of the amount of air flowing into the heater core 35 after having passed through the evaporator 32 to the amount of air to be directly introduced to a discharge or blow-out port 40 opening in the vehicle chamber near the top thereof by circumventing the heater core 35.

In air mixing door 39 disposed within the passage 37 serves to control the amount of air flowing to a floor-side discharge or blow-out port 52 opening in the vehicle chamber near the bottom thereof by circumventing the heater core 35 to the amount of air introduced to the floor-side discharge port 41 after having passed through the heater core 35.

An actuator 42 controls the opening degree of the air mixing door 38 in response to an output signal produced by the control circuit 100 in dependence on the negative pressure or atmospheric pressure supplied from the outlet nipple 11 of the valve case 5.

The opening degree or aperture of the air mixing door 39 is controlled by an actuator 43 in response to an output signal produced by the control circuit 100 in dependence on the negative pressure or atmospheric pressure supplied from the outlet nipple 8 of the valve case 5.

Disposed in a hot water supplying conduit on the way to the heater core 35 is a hot water cock 44 of which the opening degree is controlled by an actuator 45 of a known structure such as, for example, disclosed in Japanese Patent Publication No. 4532/1970.

More specifically, the actuator 45 controls the opening degree or aperture of the hot water cock 44 in response to an output signal produced by the control circuit 100 in dependence on the negative pressure or atmospheric pressure supplied from the valve case 5 through the outlet nipple 12.

A door 46 is opened when the amount of air flowing into the heater core 35 through the opened air mixing door 38 has attained a predetermined flow, whereby a part of air having passed through the heater core 35 is introduced to the discharge or outlet port 40.

A door 47 serves to change over the discharge outlets. More specifically, when the door 47 is at the position indicated by a solid line, the air is discharged into the vehicle chamber from the port 40, while the air is discharged in the direction toward a front window from a defroster discharge port 48 when the door 47 is at a position indicated by a broken line.

The selective positioning of the door 47 at the two positions described above is effected by an actuator 49 which in turn is controlled in response to an output signal produced by the control circuit 100 in dependence on the negative pressure or atmospheric pressure supplied from the outlet nipple 10 of the valve case 5.

Finally, a door 50 serves to change over the air discharge ports. When the door 50 is at a position indicated by a solid line, air is discharged through the floor-side discharge port 52. At the position indicated by a broken line, the door 50 cooperates with the door 47 to guide the air flow to the defroster discharge port 48.

In association with the door 50, there is provided an actuator 51 which positions selectively the door 50 at the two positions described above under the control of the control circuit 100 in dependence on the negative pressure or atmospheric pressure supplied from the outlet nipple 9 of the valve case 5.

The control circuit 100 has inputs supplied with signals from temperature sensors 53 and 54 disposed in the vehicle chamber at bottom and top thereof, respectively, an outdoor temperature sensor 55, temperature sensors 56 and 57 disposed in top and bottom blow-off or discharge ports, respectively, potentiometers 58 and 59 for detecting the positions of the air mixing doors 38 and 39, respectively, and temperature setting devices 61 and 62 disposed on a control panel 60. On the basis of these input signals, the control circuit 100 produces control signals for determining the opening degrees of the air mixing doors 38 and 39, respectively, the position of the inner/outer air change-over door 20 turning-off or -on of the compressor 31 and the revolution number of the blower motor 30.

The control panel 60 is further provided with a mode setting device 63 labelled "AUTO" for changing over an economy mode ECON in which the air conditioning operation is effected without operating the compressor 31 and an inherent air conditioning mode A/C which is effected by operating the compressor, and a mode setting device 64 for changing over a demisting mode DEMIST and a defrosting mode DEF from each other. Each of the mode setting devices is realized in a push button mechanism of a structure in which the two modes mentioned above are changed over alternately every time the associated push button is depressed. The modes as selected are indicated by indicators 65, 66, 67 and 68, respectively.

Operation of the air conditioning system is stopped by means of a turn-off switch 69. When the speed of the blower 30 is fixedly set at a low rate by means of a LOW mode setting device 70, the rotation speed of the blower 30 is fixed at a predetermined low value independent of other modes as set. On the other hand, when the revolution speed of the blower is fixed at a value corresponding to a high flow rate by means of a HI mode setting device 71, the blower is operated at a predetermined high speed independent of the other modes. When a recirculation timer mode REC is set by a timer switch 72, the indoor/outdoor air exchanging door is changed over to the position where the indoor air is circulated, independently from the other modes as set. The operating states of the blower speed mode (LO, HI) setting devices 70 and 71 and the recirculation timer mode setting switch 72 are made visible by indicators 73, 74 and 75, respectively.

A set temperature changing indicator 76 aids the temperature settings by the temperature setting devices 61 and 62 by correspondingly moving vertically a scale illuminated by a lamp. A set temperature display 77 displays digitally the temperature set by the setting devices or switches 61 and 62. An outdoor temperature display 78 displays the temperature detected by the outdoor temperature sensor 55 after having been processed by the control circuit 100.

Finally, a mode display 79 displays the operation modes of the air conditioning system.

It is important to note that the electromagnetic valve 3 is controlled in synchronism with the seven ON/OFF valves accomodated within the valve case 5 by the control circuit 100.

In the state where the electromagnetic valve 3 is not electrically energized, being disconnected from the power supply source, the valve 3 is resiliently biased to the position at which the atmospheric pressure is applied. Accordingly, the atmospheric pressure governs within the valve case 5 at that time.

The seven ON/OFF valves are not electrically energized in the steady or ordinary state. Consequently, the outlet nipples 6 to 12 are closed by the associated valve elements 14 under the force of the springs 13, respectively.

In this steady or ordinary state, it is assumed that the air mixing doors 38 and 39 as well as the doors 20, 47 and 50 are disposed at the respective positions indicated by the solid lines.

When the defroster mode DEF is selected by the mode setting button 64, starting from the above mentioned state, the control circuit 100 responds thereto and determines that the negative pressure or vacuum has to be supplied to the actuators 49 and 51. At the same time, the control circuit 100 causes the electromagnetic valve 3 to be electrically energized from the power supply source so that the negative pressure is supplied to the valve case 5.

Consequently, the electromagnetic valve 3 closes the inlet port for the atmospheric pressure, while opening the inlet port for the negative pressure, to thereby allow the negative pressure to be fed to the valve case 5 through the pipe 4.

After confirming the electrical energization of the electromagnetic valve 3, the control circuit 100 produces the signals for energizing the coils 15 of the ON/OFF valves associated with the nipples 9 and 10, respectively, for a predetermined time. This results in that the valve elements 14 of these ON/OFF valves are pulled against the forces of the associated springs 13, whereby the negative pressure is released through the nipples 9 and 10. As the consequence, the actuators 49 and 51 are contracted against the forces of respective springs (not shown), which in turn results in that the doors 47 and 50 are moved to the respective positions indicated by the broken lines. Thus, the defroster mode is established.

After lapse of a predetermined time required for switching the doors 47 and 50 to the positions mentioned above, the supply of electric energy to the ON/OFF valves is interrupted to block the outlet nipples 9 and 10. Subsequently, the current supply to the electromagnetic valve 3 is also interrupted, resulting in that the valve element thereof remains in the state closing the negative pressure feeding passage while opening the atmospheric pressure feeding passage. Thus, the valve case 5 is supplied with the atmospheric pressure through the pipe 4.

When it is determined that a given one of the actuators requires the supply of the atmospheric pressure thereto, the control circuit 100 first confirms the deenergized state of the electromagnetic valve 3 and then electrically energizes the ON/OFF valve associated with the said given actuator to open the associated nipple, whereby the given actuator is supplied with the atmospheric pressure.

When it is determined that the atmospheric pressure has to be supplied to a given actuator in the state in which other one of the actuators is supplied with the negative pressure, the control circuit 100 first terminates the supply of the negative pressure to the latter and waits for the state in which the atmospheric pressure governs within the valve case 5, whereupon the ON/OFF valve combined with the outlet nipple which leads to the former is opened. Thus, the former actuator is supplied with the atmospheric pressure.

When the air mixing doors and other mode determining doors have been set in the steady state, the electromagnetic valve 3 and the seven ON/OFF valves are set in the deenergized state, being disconnected from the power supply source, until requests for changing temperature and/or switching of mode are issued. In this manner, the power consumption can be reduced.

In the case of the embodiment described above, the changing-over between the negative pressure and the atmospheric pressure supplied by the pressure source is effected in response to the requests issued by the individual actuators. It should however be understood that the pressure source can be implemented in such a structure that the negative pressure and the atmospheric pressure are alternately produced periodically at a predetermined time interval. In this case, the ON/OFF valves can be actuated in synchronism with the alternation of the output of the pressure source to thereby allow the associated actuators to be supplied with either the negative pressure or the atmospheric pressure.

More specifically, the electromagnetic valve 3 is repetitively changed over between the energized state and the deenergized state periodically at a predetermined time interval, e.g. 0.2 second. Thus, the pipe 4 is supplied alternately with the negative pressure and the atmospheric pressure from the pressure source including the electromagnetic valve 3.

During a period of 0.2 second in which the negative pressure is supplied to the valve case 5 through the pipe 4, the control circuit 100 energizes electrically those ON/OFF valves which are associated with the outlet nipples leading to those actuators issuing the request for the supply of the negative pressure. When the request for the negative pressure is not satisfied by the single supply during the above mentioned period of 0.2 second, the corresponding ON/OFF valves are again actuated to supply the negative pressure when the pressure source produces the negative pressure in the next cycle. This operation is repeated until there exists no request for the negative pressure supply. On the other hand, during the period of 0.2 second in which the atmospheric pressure is supplied to the valve case 5, the control circuit 100 electrically energizes those ON/OFF valves associated with the nipples leading to the actuators which require the atmospheric pressure.

With the modified arrangement described above, any actuator can be controlled rather instantaneously without any substantial waiting time (which is 0.2 second at the longest in the case mentioned above). Thus, there can be realized an air conditioning system which is excellent in respect to the response characteristic in the temperature control as well as operation mode control.

It should be mentioned here that the opening degree or aperture of the air mixing door may be arithmetically determined with the aid of a microcomputer, as disclosed in U.S. Pat. No. 4,513,808.

Now, a description will be made on a control flow executed by a microcomputer in the air conditioning system described above.

Figure 4:
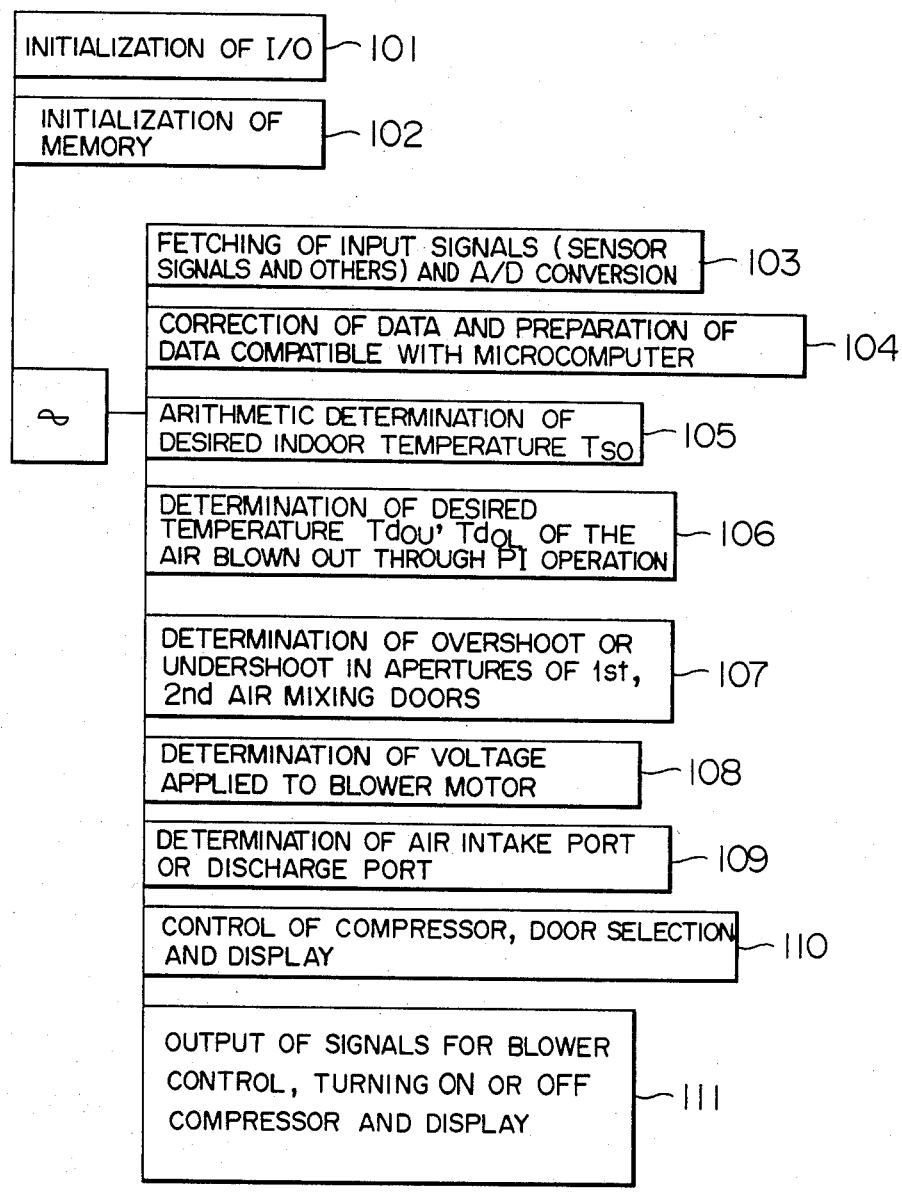
FIG. 4 shows a flow chart for illustrating a main control program for a negative pressure controlling system of the apparatus.

FIG. 4 shows a program analysis diagram or PAD for illustrating a flow of a main program which is composed of an input/output (I/O) initialize routine 101 and a memory initialize routine 102 both being executed only once immediately after resetting of the microcomputer, and a succeeding control routine which is executed repeatedly. When the power supply is turned on by operating an ignition key switch or the like of a motor vehicle, the microcomputer is first reset, whereby the control is so forced that execution of the initialize routine is started. Through the I/O initialize routine 101, the microcomputer itself is initialize to predetermined internal conditions while signals at input and output terminals are set to predetermined states. Subsequently, through the memory initialize routine, a memory circuit is loaded with or cleared of data, as required. Now, the microcomputer is in the state ready for executing the control routine where a series of control and operational steps are executed repetitively until the power supply is turned off, as described below in detail.

At an input signal reading or fetching step 103, various input signals such as operator's signals originating in operations by operator or driver, temperature signals from various sensors and others are inputted to the microcomputers. The operator's signals include an ON/OFF signal for turning on or off the air conditioning system, select signal for selecting a temperature to be set, an operation mode signal (for switching the air suction and the air brlow-off), a signal for selecting air flow rate. The temperature signals include those indicative of the temperature of outdoor air, temperature of indoor air, temperature of air at the discharge ports, temperature of engine cooling water, air temperature at entrance and exit of the evaporator. The other signals may include those indicative of insolation, vehicle speed and the like. All of these signals undergo analogue-to-digital (A/D) conversion before being fetched by the microcomputer.

Next, at a routine step 104 for correction of input data and preparation of data compatible with the microcomputer, the data resulted from the A/D conversion are corrected with respect to the non-linearity and subjected to reduction in unit, so that data can be obtained which are easy to be processed by the microcomputer.

Next, at an arithmetic routine step 105, a desired indoor temperature $T_{so}$ is arithmetically determined on the basis of the values set by operator or driver and in dependence on the outdoor temperature, insolation and additionally the operation made as selected, so that comfortable indoor temperature environment can be automatically established and maintained by shifting or adjusting the temperature set by the operator or passenger, if necessary.

Next, at a routine step 106, desired temperatures $Td_{LO}$ and $Td_{UO}$ of the air blown out through the upper and lower discharge ports are determined through proportional plus integral operation on the basis of the fetched indoor temperature and the desired indoor temperature value determined at the preceding step 104 for maintaining the comfortable temperature environment within the vehicle chamber.

At a succeeding step 107, overshoot or undershoot in the apertures of the first and second air mixing doors are determined through comparison technique on the basis of the fetched temperatures $T_U$ and $T_L$ of the air blown out from the upper and bottom discharge ports, respectively, and the desired blown-out air temperature $Td_{UO}$ and $Td_{LO}$ determined at the aforementioned stop 106, to prepare signal data $N_W$ and $N_U$ for correcting the door positions, if necessary. Through the routine including the steps 103 and 107 described so far, preparation has been made for the temperature control. In this connection, it should be noted that the control of the air mixing doors and others for the temperature control can not follow immediately the above routine, because the control must be effected on the time basis. Accordingly, in succession to the arithmetic routine mentioned above, succeeding steps of the main program are exected, and the control of the apertures or opening degrees of the air mixing doors is performed through a timer interrupt routine described hereinafter.

Next, at a step 108 of the main program, the voltage applied to the blower motor is measured for determining the air flow rate as blown out. When the desired temperature $T_{S0}$ as set is approximately equal to the indoor temperature $T_R$, the air flow to be discharge or blown out is set at a relatively low value. As the difference between $T_{S0}$ and $T_R$ increases, the air flow rate is set at correspondingly higher values. In table 1, there are listed the controlled states of the air conditioning system and the given conditions inclusive of the temperature factors $T_{S0}$, $T_R$ and $T_S$ and operation of the blower.

TABLE 1

| CONDITIONS | CONTROLLED STATE |
| --- | --- |
| (1) $(T_{SO} - T_R) > 15$ [°C.] and that $(T_S - T_R) > 0$ | Stop of air conditioner |
| (2) $T_R < 5$ [°C.] | Stop of air conditioner |
| (3) Stop of blower motor | Stop of air conditioner |
| (4) Within 20 second after stop of blower | Inhibit of reactivation |

Next, at a step 109, the air intake port or the air discharge port is determined, which is followed by the step 110 where the control of the indoor/outdoor air switching doors as well as the turning-on or -off of the compressor are determined on the basis of the command value inputted by the operator and the temperature conditions. Concurrently, the relevant operating states are displayed visible to the operator through the monitor display field at a step 110. More specifically, the control conditions for the indoor air/outdoor air changeover door are listed in the following table 2, while the conditions for controlling operation of the compressor are listed in the table 3.

TABLE 2

| CONDITIONS | INTAKE AIR (Door Position) |
| --- | --- |
| (1) $(T_R - T_{SO}) \leq -5$ [°C.] | Outdoor Air (a) |
| (2) $-5$ [°C.] $\leq (T_R - T_{SO}) \leq 5$ [°C.] | Indoor/Outdoor Air Mixture |
| (3) $5$ [°C.] $\leq (T_R - T_{SO})$ | Indoor Air (c) |
| (4) Defroster Mode | Outdoor Air (a) |

TABLE 3

| CONDITIONS | APPLIED VOLTAGE |
|---|---|
| (1) $(T_R - T_{SO}) \leq -5$ [°C.] | 10 [V] |
| (2) $-5$ [°C.] $\leq (T_R - T_{SO}) \leq -2$ [°C.] | $(T_{SO} - T_R) \times 2$ [V] |
| (3) $-2$ [°C.] $\leq (T_R - T_{SO}) \leq 5/3$ [°C.] | 4 [V] |
| (4) $5/3$ [°C.] $\leq (T_R - T_{SO}) \leq 5$ [°C.] | $(T_R - T_{SO}) \times \frac{12}{5}$ [V] |
| (5) $5$ [°C.] $\leq (T_R - T_{SO})$ | 12 [V] |
| (6) Within $10 \pm 2$ second from the start | Progressive increasing from 4 [V] to 12 [V] |
| (7) Coolant temperature $> 35°$ C. and that $T_R < T_{SO}$ | Stop |
| (8) Defroster mode | 12 [V] |
| (9) After 5 minutes from the start | Lowering from 12 [V] to 8 [V] |

Finally, at a signal output step 111, the microcomputer produces output signals representative of the various results determined through the routine described so far except for the signals for the operations which are to be performed as a function of time, whereby the relevant devices are actuated. In reality, the control routine is executed repeatedly at a very high speed so that the temperature control is effected instantaneously in response to the commands inputted by the operator and changes in temperatures at the various parts.

Figures 5, 6, 7:
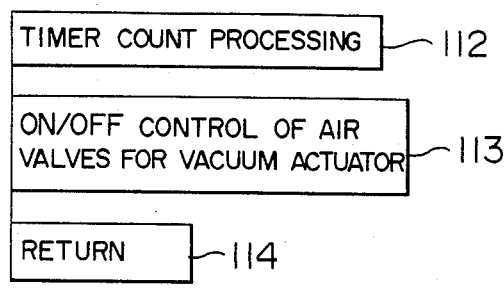
FIG. 5 is a flow chart for illustrating an interrupt routine.
FIG. 6 is a schematic view showing a piping arrangement for fluid pressure change-over system.
FIG. 7 is a view showing a part of a memory map.

FIG. 5 is a flow chart for illustrating a flow of the timer interrupt routine mentioned hereinbefore. Depending on hardware implementation of the microcomputer, the timer interrupt routine is forcively executed periodically at a predetermined interval by interrupting the main routine. Accordingly, the processing to be performed after lapse of a predetermined time as well as the processing to be performed on the time basis can be executed by making use of this time interrupt routine.

Referring to FIG. 5, time is measured at a timer count processing step 112. The time interval at which the timer interrupt routine is executed is usually on the order of several milli-seconds. Accordingly, for creating longer time spans as required for the operation to be performed, for example, once a minute or to be stopped after ten minutes, the timer counter is counted up or incremented every time this interrupt routine is activated to prepare a time reference to be utilized in performing the various time-related controls.

Next, at an air valve on/off control step 113, the output signals for the time-related controls such as the control of the air mixing doors which result from the execution of the main program are processed. More specifically, the output signals for controlling the air mixing doors on the basis of the overshoot and/or undershoot data of the apertures are sequentially changed as a function of time lapse measured by the timer counter. Since this step bears a particular relation to a time-sharing control, further detailed description will be made hereinafter in conjunction with FIG. 6.

Finally, at a return routine 114, the state before the interrupt routine was executed is regained to allow the main program to be executed.

Now, execution of the time sharing control adopted in the illustrated system will be described from the standpoint of software.

Referring again to FIGS. 1 and 6, the three-way electromagnetic valve 3 has a first port connected to the negative pressure source, a second port communicated to the atmosphere and a third port to which the individual actuators are connected by way of respective two-way valves. The time sharing control supplies the negative pressure to the individual actuators in an appropriate manner by controlling operation of the air valves (i.e. the three-way valve and the two-way valves) as a function of time. For realizing the time sharing control, it is necessary to clarify previously the following times.

(1) Determination of operations required for the individual actuators (i.e. determination of stop or communication to the atmosphere or to the negative pressure as required for the actuators, respectively.)

(2) Allocation of preference or priority to the operations of the actuators on the basis of the results of the determination mentioned above to perform the ON-/OFF control on a time-serial (sequential) basis.

Since the first item (1) bears no direct relation to time, the required operations can be determined repeatedly in the course of execution of the main program. On the other hand, concerning the item (2) mentioned above, management of time is required on the time-serial basis in dependence on the various control quantities. Accordingly, the timer interrupt routine described hereinbefore in conjunction with FIG. 5 must be resorted to. To this end, means for transmitting the results of the arithmetic operations included in the main routine to the timer interrupt routine has to be provided. This means can be implemented by utilizing as flags parts of a memory incorporated in the microcomputer.

More specifically, referring to FIG. 6 and assuming that seven actuators denoted by Act 1, Act 2, ..., Act 7 are to be controlled, there are required seven two-way valves (ON/OFF) A/V1, A/V2, ..., A/V3 for the seven actuators, respectively, and one three-way valve having one port connected to the negative pressure source. In correspondence, there are provided eight flag areas M0, M1, ..., M8 in the memory of the microcomputer, as illustrated in FIG. 7. It is assumed that each of the flags is of a eight-bit size and may assume a value within a range of $-129$ to $+128$ inclusive of zero. Functionally, the flag M0 corresponds to the three-way valve connected to the negative pressure source, while the flags M1, M2, ..., M7 correspond to the two-way valves A/V1, A/V2, ..., A/V7, respectively. When the flag M0 is of a positive value (inclusive of zero), this means that the three-way valve will be opened to the atmosphere. Conversely, when the flag M0 is of a negative value, this means that the three-way valve be set to the state conducting the negative pressure therethrough. The values of this flag are determined and/or rewritten in the course of executing the timer interrupt routine. On the other hand, when the flag M1, ... or M7 is of a value zero, this means that the corresponding actuator is to be stopped. When the flag M is of a positive value, the corresponding actuator is to be opened to the atmosphere. The flag of a negative value indicates that the negative pressure must be supplied to the corresponding actuator, wherein the absolute value of the flag represents the magnitude or amount of the control to be performed. For example, let's consider that the flag M1 has a value of "+20". This means that the corresponding actuator Act 1 has to be opened to the atmosphere for a time duration corresponding to the absolute value of "20". The flag M5 of a value of "$-15$" indicates that the corresponding actuator Act 5 be coupled to the negative pressure source for a time duration corresponding to the absolute value of "15". The values or contents of the flags are determined in the course of execution of the main program and stored in the memory at respective flag areas. In the execution of the timer interrupt routine, operations of the individual valves and hence actuators are determined by referring to the values of the flags.

As a system for operating the individual actuators in correspondence to the values of the respective flags, a priority-based sequential control of the ON time of the two-way valves associated with the individual actuators, respectively, will be described in conjunction with the timer interrupt routine.

Figure 8:
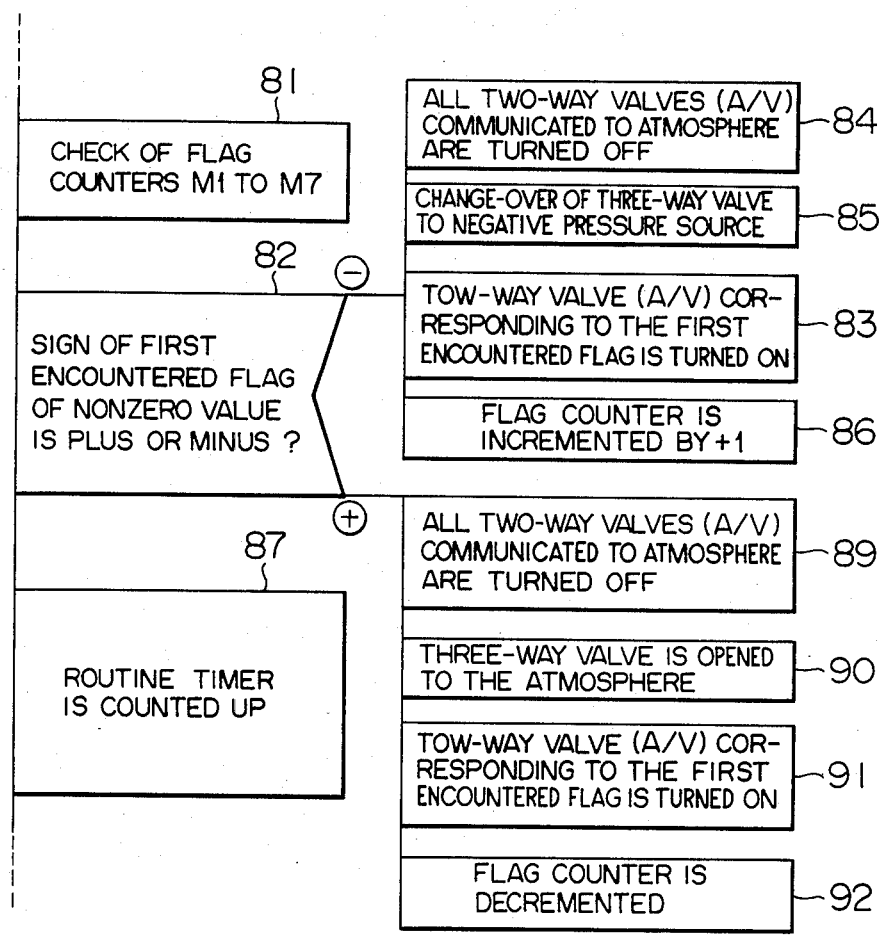
FIG. 8 shows a flow chart for illustrating a timer interrupt routine.

FIG. 8 is a block chart illustrating the priority-based sequential control mentioned above. This control routine is in actuality performed at the air valve ON/OFF control step of the timer interrupt routine shown in FIG. 5. The routine illustrated in FIG. 8 is executed periodically at a predetermined time interval of e.g. 10 ms. At a first block 81, the flags M1 to M7 are checked. When the value of the flag is "0", the corresponding two-way valve is turned off to thereby stop the corresponding actuator. In continuing the check of the flags M1 to M7, the sign of the flag $M_x$ ($x=1-7$) of a non-zero value first encountered is examined at a step 82. If the sign is negative ($-$), the routine is branched to sub-routine where the negative pressure is applied to the corresponding actuator Act x. More specifically, all the two-way valves opened to the atmosphere (corresponding to the flags having positive or plus values) are turned off (step 84), which is followed by the changing-over of the three-way valve to the negative pressure source (step 85). Subsequently, the two-way valve $A/V_x$ corresponding to the checked flag $M_x$ mentioned above is operated (step 83). Through the series of operations mentioned above, the negative pressure is applied to the actuator Act x by way of the three-way valve and the two-way valve $A/V_x$ to start the operation as required. At a step 86, the content of the flag $M_x$ is concurrently incremented by $+1$ (i.e. toward zero) for controlling the period during which the negative pressure is applied.

Upon reactivation of the timer interrupt routine after lapse of 10 ms, the same processing as described above is executed unless the value of the flag $M_x$ is zero. This processing is repeated at the time interval of 10 ms until the content of the flag $M_x$ becomes zero. In this manner, the negative pressure is applied to the actuator Act x for a period equal to the product of 10 ms multiplied with the absolute value of the flag $M_x$.

Subsequently, the time measuring timers T1 to T7 are counted up (i.e. incrementing of time data) for measuring the time lapse after the output processing at a step 87.

When the content of the flag $M_x$ has attained zero, then the content of the flag $M_{(x+1)}$ is checked in the succeeding time interrupt routine. When the flag $M_{(x+1)}$ contains a positive value, the routine is branched to a sub-routine 101 for causing the corresponding actuator Act $(x+1)$ to be opened to the atmosphere. The individual steps 89 to 92 of this sub-routine bear one-to-one correspondence to the aforementioned steps 84, 85, 83 and 86 for applying the negative pressure to the actuator corresponding to the flag having a negative value. Accordingly, further discription will be unnecessary.

The processings described above are executed for the flag M1 to the flag M7 in this sequence. More specifically, so long as the two-way valve A/V1 corresponding to the flag M1 is not operated, the processing for operating the two-way valve A/V2 and hence the actuator Act 1 can not be initiated. Accordingly, the processing associated with the flag M1 is allotted with the highest priority which is progressively lowered for the flags M2, M3, . . . , M7 in this order.

In execution of the processings in the order of M1 to M7, the other two-way valves remain inoperative until operation of the valve allotted with the higher priority than said other valves is stopped. However, the maximum time for which each of the two-way valves and the actuators is permitted to operate continuously (i.e. the value of the set flag) is limited so as to be less than a predetermined value. In any case, the two-way valve and the associated actuator are continuously turned on for a period proportional to the value of the corresponding flag becomes zero.

Figure 2:
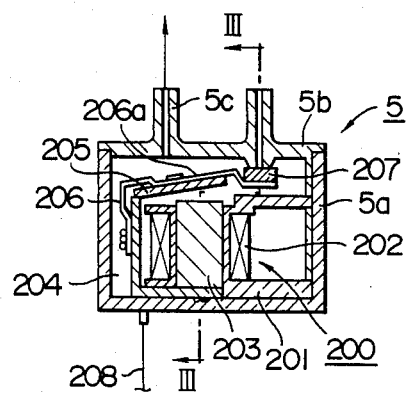
FIGS. 2 and 3 are views showing structures of an electromagnetic ON/OFF valve mechanism which constitutes a part of the control apparatus according to the invention.
Figure 3:
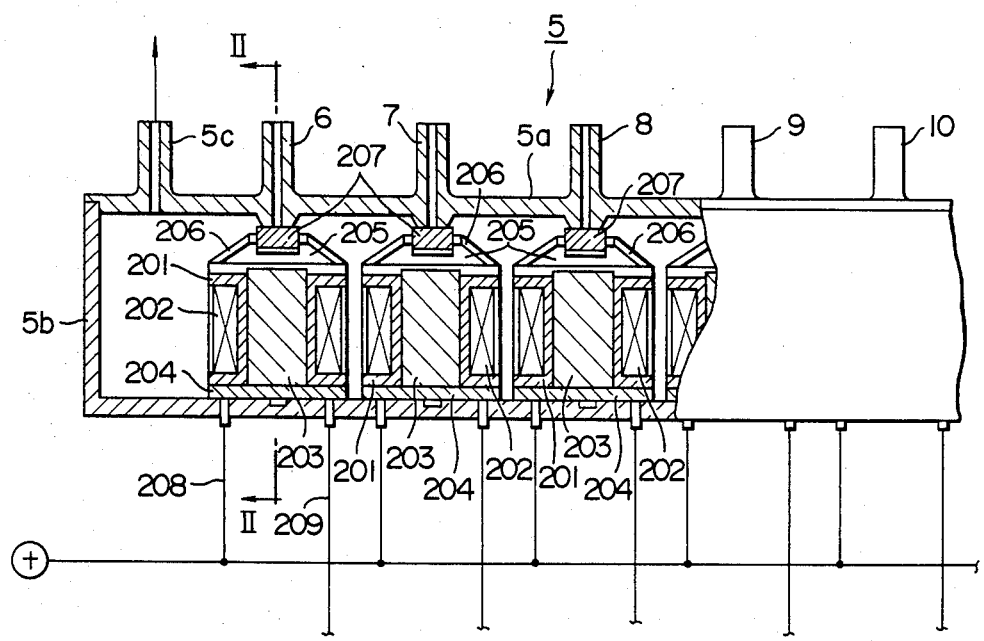

Next, the structure of the ON/OFF valves disposed within the valve case 5 will be described in detail by referring to FIGS. 2 and 3.

The valve case 5 is composed of a box-like casing member 5a having an open top and top cover 5b for hermetically closing the open top. The top cover member 5b is integrally formed with the inlet nipple 5c for introducing the atmospheric pressure or negative pressure into the valve case 5 from respective pressure sources. Further, the top cover member 5b is integrally formed with outlet nipples 6 to 12 with a distance from the inlet nipple 5c for feeding the negative pressure or the atmospheric pressure to the associated actuators, respectively, (with the outlet nipples 11 and 12 being omitted from illustration).

Disposed within the casing 5a are valve assemblies adapted to be actuated by respective electromagnets.

More specifically, each of the electromagnetic valve assemblies includes an annular coil 200 formed by a conductor 202 wound on an annular bobbin 201. A cylindrical inner yoke 203 of a magnetic material is fixedly inserted into a bore of the annular bobbin 201. An outer yoke 204 of L-shape in cross-section is disposed on the outer periphery of the bobbin 200 to constitute a magnetic circuit in cooperation with the inner yoke 203. A movable piece 205 is supported on the outer yoke 204 by means of a leaf spring 206 to complete the magnetic circuit in cooperation with the outer and inner yokes 203 and 204. The leaf spring 206 is of L-like configuration in cross section and has one end portion mounted on the side wall of the outer yoke member 204 and an upper arm 206a on which the movable piece 205 is mounted. The movable piece 205 is rotatably supported at one end thereof on the top end of the outer yoke member 204, while the other end of the movable piece 205 extends to a position above the top surface of the inner yoke. The leaf spring 206 exerts a spring force to the movable piece 205 so that the other end of the movable piece 205 is resiliently urged away from the top surface of the inner yoke swingably about the contact portion between the leaf spring 206 and the outer yoke 204. A valve element 207 made of a rubber is mounted on the free end of the leaf spring 206, wherein the valve element is pressed under the force of the leaf spring 206 so as to block the port of the outlet nipple (e.g. the nipple 6).

Upon energization of the coil 202 by a current supplied through lead wires 208 and 209, a magnetic circuit is formed, extending through the inner yoke 203, the outer yoke 204 and the movable piece 205, as the result of which the leaf spring 206 is pulled toward the top surface of the inner yoke 203 under the magnetic attraction produced between the free end of the movable piece 205 and the top surface of the inner yoke 203 by overcoming the force exerted by the leaf spring 206. At that time, the valve element 207 is moved away from the port of the outlet nipple, resulting in that pressurized fluid within the valve case 5 flows out through the outlet nipple.

The valve arrangement described above is advantageous in that the ON/OFF valves for controlling the air supply to the individual actuators can be assembled and installed at a single location, whereby the wiring of leads is much simplified. Further, a single pipe 4 is sufficient for supplying the pneumatic pressure to the valve case, rendering it unnecessary to provide fluid supply tubes separately to each of the ON/OFF valve, whereby the fluid supply piping can be much simplified.

As will be appreciated from the foregoing description, by virtue of such arrangement in which the negative pressure and atmospheric pressure can be selectively produced from a pressure source and in which the valve means disposed between the pressure source and the actuators, respectively, is operated to open the fluid path therebetween only when the pressurized fluid required by the actuator coincides with the pressurized fluid supplied from the pressure source, the electric power consumption involved in driving the fluid control valves can be reduced remarkably.

I claim:

1. Apparatus for controlling supply of a negative pressure and the atmospheric pressure to actuators operative under the negative pressure, said actuators in turn controlling associated devices to be controlled, comprising:

a pressure source capable of producing selectively and alternately said negative pressure and said atmospheric pressure, wherein said pressure source includes a negative pressure tank, a negative pressure inlet port connected to said negative pressure tank, an atmospheric pressure inlet port opened to the atmosphere, a fluid pressure medium outlet port, and an electromagnetic change-over valve mechanism for connecting alternately said negative pressure inlet port and said atmospheric pressure inlet port to said fluid pressure medium outlet port periodically at a predetermined time interval;

decision means for deciding whether the negative pressure or the atmospheric pressure is to be applied to said actuators; and control means responding to the output of said decision means for connecting the actuator to be supplied with the negative pressure to said pressure source during a period in which the said pressure source produces the negative pressure and connecting the actuatory to be supplied with the atmospheric pressure to said pressure source during a period in which said pressure source produces the atmospheric pressure.

2. A control apparatus according to claim 1, wherein said control means includes electromagnetic ON/OFF valves for selectively conducting or blocking fluid passages between said pressure source and said actuators, respectively, and synchronizing means responding to the output of said decision means for synchronizing operation of each of said electromagnetic ON/OFF valves with the changing-over of the outputs of said pressure source.

3. A control apparatus according to claim 2, wherein a plurality of said electromagnetic ON/OFF valves include a plurality of electromagnetic valve assemblies disposed within a case which is formed with outlet nipples associted with valve elements of said electromagnetic valve assemblies, respectively, said case being further formed with an inlet nipple for receiving fluid pressure medium from said pressure source.

4. An apparatus for controlling supply of a negative pressure and the atmospheric pressure to actuators operative under the negative pressure, said actuators in turn controlling associated devices to be controlled, comprising:

a pressure source capable of producing selectively and alternately said negative pressure and said atmospheric pressure, wherein said pressure source includes a negative pressure tank, a negative pressure inlet port connected to said negative pressure tank, an atmospheric pressure inlet port opened to the atmosphere, a fluid pressure medium outlet port, and an electromagnetic change-over valve mechanism for connecting alternately said negative pressure inlet port and said atmospheric pressure inlet port to said fluid pressure medium outlet port;

decision means for deciding whether the negative pressure or the atmospheric pressure is to be applied to said actuators; and control means responding to the output of said decision means for connecting the actuator to be supplied with the negative pressure to said pressure source during a period in which the said pressure source produces the negative pressure and connecting the actuator to be supplied with the atmospheric pressure to said pressure source during a period in which said pressure source produces the atmospheric pressure, wherein said control means includes electromagnetic change-over valve mechanism controlling means which responds to the output of said decision means for allowing said pressure source to output the fluid pressure medium required by said actuator, and electromagnetic ON/OFF valves for selectively conducting or blocking fluid passages between said pressure source and said actuators, respectively and electromagnetic ON/OFF valve control means for making conductive the electromagnetic valve associated with the actuator requesting the supply of fluid pressure medium produced by said pressure source.

5. A control apparatus according to claim 4, wherein a plurality of said electromagnetic ON/OFF valves include a plurality of electromagnetic valve assemblies disposed within a case which is formed with outlet nipples associated with valve elements of said electromagnetic valve assemblies, respectively, said case being further formed with an inlet nipple for receiving fluid pressure medium from said pressure source.

* * * * *